United States Patent [19]

Kuroda et al.

[11] Patent Number: 4,837,083

[45] Date of Patent: Jun. 6, 1989

[54] MAGNETIC RECORDING MEDIUM

[75] Inventors: Kazuhiro Kuroda, Nagano; Kazushi Tanaka, Komoro; Hitoshi Azegami, Nagano, all of Japan

[73] Assignee: TDK Corporation, Tokyo, Japan

[21] Appl. No.: 95,298

[22] Filed: Sep. 10, 1987

[30] Foreign Application Priority Data

Sep. 18, 1986 [JP] Japan .................. 61-218084

[51] Int. Cl.$^4$ .............................................. G11B 5/70
[52] U.S. Cl. .................... 428/329; 427/128; 428/694; 428/900
[58] Field of Search .............. 428/694, 329, 695, 900, 428/328; 427/128; 252/62.54

[56] References Cited

U.S. PATENT DOCUMENTS

| | | | |
|---|---|---|---|
| 4,109,048 | 8/1978 | Dessauer et al. | 428/325 |
| 4,238,341 | 12/1980 | Kato et al. | 252/62.54 |
| 4,328,935 | 5/1982 | Steel | 428/694 |
| 4,420,408 | 12/1983 | Kajimoto et al. | 256/62.54 |
| 4,420,532 | 12/1983 | Yamaguchi et al. | 428/329 |
| 4,425,400 | 1/1984 | Yamaguchi et al. | 428/329 |
| 4,460,651 | 7/1984 | Hosaka et al. | 428/694 |
| 4,571,362 | 2/1986 | Sato et al. | 428/329 |
| 4,618,536 | 10/1986 | Morioka et al. | 428/329 |
| 4,652,500 | 3/1987 | Ejiri et al. | 428/695 |
| 4,670,337 | 6/1987 | Tokuoka et al. | 428/329 |
| 4,671,993 | 6/1987 | Kadokura et al. | 428/328 |
| 4,687,703 | 8/1987 | Miyoshi et al. | 428/694 |

FOREIGN PATENT DOCUMENTS 59-82634  5/1984  Japan .

*Primary Examiner*—Paul J. Thibodeau
*Attorney, Agent, or Firm*—Seidel, Gonda, Lavorgna & Monaco

[57] ABSTRACT

A magnetic recording medium comprising a plastic base and a magnetic layer formed thereon by applying a dispersion of a ferromagnetic powder in a resin binder, the magnetic layer containing the ferromagnetic powder which has a BET specific surface area of at least 35 $m^2/g$ and $\alpha$-Al2O3 particles having a particle size not exceeding one half the mean particle diameter of the ferromagnetic powder and less than 0.1 $\mu$m in diameter, the $\alpha$-Al2O3 particles being added in an amount greater than 5% but less than 15% by weight on the basis of the weight of the ferromagnetic powder. The magnetic powder is a metallic magnetic powder containing iron as the major constituent. The $\alpha$-Al2O3 particles are cube-shaped.

2 Claims, No Drawings

MAGNETIC RECORDING MEDIUM

BACKGROUND OF THE INVENTION

This invention relates to a magnetic recording medium, and more specifically to a high-density magnetic recording medium containing $\alpha$-Al2O3 particles in the magnetic layer thereof.

In the manufacture of a magnetic recording medium, for example, in the form of audio or video tapes or data memory media, it is commonly in practice to add a nonmagnetic inorganic abrasive material such as Al2O3, Cr2O3, Cr2O3, TiO2, SiO2, SiC, $\alpha$-Fe2O3, or ZnO2 to the magnetic layer to protect the latter against damage due to contact with the magnetic head.

Proper choice must be made of the abrasives, particle size, and quantity of the inorganic material powder to be added; otherwise, the particles accelerate the wear of the magnetic head or deteriorate the electromagnetic characteristics of the medium. One approach to minimize these drawbacks has been to reinforce the magnetic layer by a small amount of addition of an abrasive powder having a mean particle diameter of about 0.5 $\mu$m. Tapes using metallic magnetic particles have a disadvantage of being easily damaged by contact with the head since the metallic powder is lower in hardness than the iron oxide powder. A general solution employed to this problem has been mixing the metallic magnetic powder with a nonmagnetic powder of greater hardness, however it requires by far the larger amount of the reinforcing material than the iron oxide powder does.

The present inventors have made their studies in search of a magnetic recording medium excellent in electromagnetic characteristics and a durability with a minimum of head clogging through suitable choice of the abrasive and its particle size of an inorganic material as a coated film reinforcing material.

In recent years, magnetic powders of finer particles, more highly dispersible binders, and smoother tape surfaces have come into extensive usage to meet the requirements for higher performance video tapes and tapes for digital equipment. In these applications the reinforcement of the coated film by the addition of the high-hardness nonmagnetic powder tends to affect adversely the durability of the magnetic coated film or the reduction of deposition on the head. In view of these, there has been a demand for some method of achieving improvements in the durability of the coated film and also in the head-cleaning effect.

The commonly used inorganic material particles, when incorporated in such high-performance tapes, would pose problems. For example, the addition can deteriorate the electromagnetic characteristics, damage the tape during runnings due to an insufficient reinforcing effect, or lead to head clogging heavy enough, for example, to mar the picture quality of the video tape. The present inventors thought that the problems involved in the enhancement of performance could be settled by the proper selection of the particle size as well as the kind of an inorganic material as a coated film reinforcing material.

This application previously found (Japanese Patent Application No. 92405/1986) that the addition of $\alpha$-Al2O3 particles having a mean particle diameter in the range of 0.1 to 0.3 $\mu$m to the magnetic layer of a magnetic recording medium using fine ferromagnetic powder with a specifric surface area of 35 m$^2$/g or more as determined by the BET method would satisfy the otherwise incompatible requirements for the reduction of damage and wear of the magnetic head and for the reduced wear of the magnetic tape. Nevertheless, the disclosure has still been unsatisfactory in respect of the wear of the head.

The present invention therefore has for its object of the provision for a magnetic recording medium which causes less clogging, wear, or damage of the head and less wear of the magnetic layer of the medium than heretofore.

SUMMARY OF THE INVENTION

The $\alpha$-Al2O3 powder in common use has a mean particle diameter generally equal to the particle size of the magnetic powder to be employed. According to this invention, by contrast, a magnetic powder having a BET specific surface area of at least 35 m$^2$/g and $\alpha$-Al2O3 particles as abrasives having a particle size not exceeding one half of the mean particle diameter of the magnetic powder and less than 0.1 $\mu$m in diameter are used. The combination remarkably improves the abrading or polishing effect to solve the problems of clogging of the metallic head surface and reduce the wear of the head.

DETAILED DESCRIPTION OF THE INVENTION

The present invention attains outstanding function and effects with a fine magnetic powder, which has a specific surface area of at least 35 m$^2$/g as measured in conformity with the BET method. Such fineness proves particular advantage with the metallic magnetic powders usually used on what are known as high-performance recording tapes. The mean particle diameter of such a powder is approximately 0.35 $\mu$m or below, although it is not precisely proportional to the BET specific surface area.

With such a fine magnetic powder, the afore-mentioned prior patent application used $\alpha$-Al2O3 particles of a substantially equal mean particle diameter, but the combination failed to prove fully satisfactory. This invention makes it possible to form a most excellent magnetic film by the adoption of $\alpha$-Al2O3 particles having a mean particle diameter one half or less of that of the magnetic powder and less than 0.1 $\mu$m in diameter.

Particularly desirable $\alpha$-Al2O3 particles are cubically shaped. Granular particles are somewhat inferior in respect of the clogging on the head. Cubic particles may appear to cause premature wear of the head but actually they do not. This $\alpha$-Al2O3 particles may be produced by the organic alumina process, which comprises the following steps:

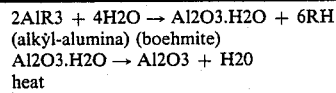

The $\alpha$-Al2O3 produced in this way is a powder of fine, uniform particles with a narrow range of particle size distribution.

The $\alpha$-Al2O3 particles formed by the organic clumina process are sinterd under certain conditions to be finer in size than any of the powders of the same material produced by other processes. Moreover, the $\alpha$Al2O3 powder is characterized by the controllability of the rate of alpha phase in the crystal. The $\alpha Al2O3$ that contains a high crystalline $\alpha$ phase rate possesses greater polishing ability and wear resistance than the $\alpha Al2O3$ with a lower rate of $\alpha$ phase. Reinforcing materials for high-picture quality video tapes are required to exhibit a head-cleaning effect. The $\alpha Al2O3$ with an $\alpha$ phase rate of 50% or more combines a reinforcing effect with a head-cleaning effect and hence is suitable as a reinforcing material for high-picture quality video tapes.

Under the invention the $\alpha Al2O3$ powder is used in an amount within the range of 5 to 15% by weight. If the amount is less than 5% by weight, it is not effective in reducing the head clogging. If the amount exceeds 15% by weight, it causes much wear of head and unwanted variation or decrease of the output will result.

The invention is illustrated by the following examples.

EXAMPLES AND COMPARATIVE EXAMPLES

Magnetic coating materials were prepared from compositions consisting of:

| | |
|---|---|
| metallic magnetic powder* | 100 parts by weight |
| vinyl chloride-vinyl acetate copolymer | 10 parts by weight |
| urethane resin | 10 parts by weight |
| MEK | 100 parts by weight |
| MIBK | 50 parts by weight |
| toluene | 50 parts by weight |
| cyclohexanone | 50 parts by weight |
| isocyanate | 5 parts by weight |
| $\alpha$-Al2O3 particles (several mean particle diameter) | 5-15 parts by weight |

*Either of two different sizes, having BET specific surface areas of 35 $m^2/g$ (mean particle diameter of 0.35 $\mu m$) and 45 $m^2/g$ (0.20 $\mu m$), was employed.

In preparing each magnetic coating material of the above formulation, an $\alpha Al2O3$ powder of a chosen particle size in a chosen amount according to Table 1 was applied to the magnetic paint. Each composition was dispersed by a sand grinder for 5 hours, and the paint of each composition was coated on a polyester film so as to form a layer 4 $\mu m$ thick when dried, and it was surface finished by calendering. The calendered film was then heat-treated for hardening and slitted into magnetic tapes of a predetermined width.

TABLE 1

| Example | —Al2O3/magnetic powder size ratio | | Shape | Amount Added | Sample No. |
|---|---|---|---|---|---|
| | 45 $m^2/g$ | 35 $m^2/g$ | | | |
| Ex. 1 | 3/10 | 0.06 $\mu m$ | Cubic | 10 wt % | #1 |
| 1' | | 0.10 $\mu m$ | " | " | 1' |
| 2 | 2/5 | 0.08 | " | " | 2 |
| 3 | 1/5 | 0.04 | " | " | 3 |
| 3' | | 0.07 | " | " | 3' |
| Comp. 1 | 5/4 | 0.25 | " | " | 4 |
| 1' | | 0.44 | " | " | 4' |
| 2 | 3/2 | 0.3 | Granular | " | 5 |
| 3 | 2/1 | 0.4 | " | " | 6 |
| 3' | | 0.7 | " | " | 6' |
| 4 | 3/10 | 0.06 | Cubic | 4 wt % | 7 |
| 5 | 3/10 | 0.06 | " | 15 wt % | 8 |
| 5' | | 0.10 | " | " | 8' |

The evaluated Y-S/N values and degrees of head clogging, damage and wear of the head with the samples are given in Table 2. The measurements were taken by video tape recorder Model JVC BR-7000.

The Y-S/N value represents a value based on that of the tape manufactured by TDK as a reference tape. The degrees of head clogging and of wear and damage of the head were evaluated by inspecting the magnetic heads along which the samples were passed for a 200 hrs runnings each.

The evaluated degrees of head clogging and damage are marked as follows:

A=Good; B=Fair; C=Rather poor; D=poor

Still frame time, which is an indication of the durability of the coated film, is the period of time till which the reproducing output decreases to a half of the initial output in a pause mode with a back tension of 100 g.

Comparative Examples 1, 1', and 2 (Samples #4, #4', and #5) that used coarse particles were inferior to Sample #1 in electromagnetic characteristics and in the damage of the head after running test. Comparative Examples 2, 2', 3, and 3' (Samples #5, #5', #6, and #6') that employed granular $\alpha Al2O3$ in place of cubic $\alpha Al2O3$ exhibited less cleaning effects and slightly more clogs on the head than Samples #1 and #1'. Little differences were observed among them in respect of the wear or damage of the head.

Examples 1, 1', 2, 3, and 3' of the invention (Samples #1, #1', #2, #3, and #3') used cubic $\alpha Al2O3$ particles having a particle size not exceeding one half the size of the magnetic powder and less than 1.0 $\mu m$ in diameter and added in an amount of 10% by weight to the ferromagnetic powder. They gave generally satisfactory results in all test items of electromagnetic characteristics, head clogging, head damage, head wear, and still characteristic. The $\alpha Al2O3$ particles used in #1, #1', #2, #3, and #3' were all small enough in mean particle diameters to ferromagnetic powder to achieve excellent electromagnetic characteristics. Also, the employing of a cube shaped particles enhances the polishing effect and improves the head-cleaning effect of the above mentioned tape.

From the foregoing it is obvious that the alumina powders used in Samples #1, #1', #2, #3, and #3' were suitable as reinforcing materials for high-performance magnetic recording medium. Comparative Examples 4, 5, and 5' show the influence of variations in the amount of $\alpha Al2O3$ which is the same cube-shaped $\alpha Al2O3$ as that in Examples 1, 1', 2, 3, and 3'. The addition of 15% by weight of $\alpha Al2O3$ to the ferromagnetic powder resulted in inferior electromagnetic characteristics and greater wear of the head. Conversely, the addition of only 5% by weight brought a insufficient reinforcing effect, inadequate durability, and increased clogging on the head.

Stated as above, the amount to be added is desirably in the range of 5 to 15% by weight.

As can be seen from Table 2, the present invention employs a ferromagnetic powder having a BET specific surface area of at least 35 $m^2/g$ and cube-shaped $\alpha Al2O3$ having a particle size not exceeding one half that of the ferromagnetic powder and less than 0.1 $\mu m$ in diameter as a reinforcing material. The invention thereby renders it possible to obtain a high-quality magnetic recording medium excellent in all respects of electromagnetic transfer characteristics, head clogging, damage, wear, and still frame time.

TABLE 2

| Example | Sample | Y-S/N | Head clogging | Damage | Head wear | Still charac. |
|---|---|---|---|---|---|---|
| Ex. 1 | #1 | +4(dB) | A | B | A | A |
| 1' | 1' | +3 | A-B | B | A-B | A |
| 2 | 2 | +2 | A | B | B | C |
| 3 | 3 | +1 | A | B | B | B |

TABLE 2-continued

| Example | Sample | Y-S/N | Head clogging | Damage | Head wear | Still charac. |
|---|---|---|---|---|---|---|
| 3' | 3' | +1 | A | A | A | B |
| Comp. 1 | 4 | * | A | D | C | B |
| 1' | 4' | * | A | D | D | C |
| 2 | 5 | * | C | A | B | C |
| 3 | 6 | −5 | A | B | C | C |
| 3' | 6' |  | B | C | B | C |
| 4 | 7 | +1 | B | A | A | C |
| 5 | 8 | −3 | A | C | D | B |
| 5' | 8' |  | A-B | D | D | B |

*Not measurable.

What is claimed is:

1. A magnetic recording medium comprising a plastic base and a magnetic layer formed thereon by applying a dispersion of a ferromagnetic powder in a resin binder, said magnetic layer containing the ferromagnetic powder which has a BET specific surface area of at least 35 $m^2/g$ and cube-shape $\alpha Al2O3$ particles having a particle size not exceeding one half the mean particle diameter of the ferromagnetic powder and less than 0.1 $\mu m$ in diameter, the cube-shape $\alpha Al2O3$ particles being added in an amount greater than 5% but less than 15% by weight on the basis of the weight of the ferromagnetic powder.

2. A magnetic recording medium according to claim 1 wherein the magnetic powder is a metallic magnetic powder containing iron as the major constituent.

* * * * *